US009647464B2

(12) United States Patent
Siedenburg

(10) Patent No.: US 9,647,464 B2
(45) Date of Patent: May 9, 2017

(54) LOW NOISE POWER SOURCES FOR PORTABLE ELECTRONIC SYSTEMS

(71) Applicant: FUJIFILM Sonosite, Inc., Bothell, WA (US)

(72) Inventor: Clinton T. Siedenburg, Everett, WA (US)

(73) Assignee: FUJIFILM SonoSite, Inc., Bothell, WA (US)

( * ) Notice: Subject to any disclaimer, the term of this patent is extended or adjusted under 35 U.S.C. 154(b) by 411 days.

(21) Appl. No.: 14/214,265

(22) Filed: Mar. 14, 2014

(65) Prior Publication Data

US 2014/0265572 A1    Sep. 18, 2014

Related U.S. Application Data

(60) Provisional application No. 61/801,727, filed on Mar. 15, 2013.

(51) Int. Cl.
| | |
|---|---|
| *H02J 7/00* | (2006.01) |
| *G06F 1/26* | (2006.01) |
| *H02J 1/00* | (2006.01) |
| *H02J 7/34* | (2006.01) |

(52) U.S. Cl.
CPC ............... *H02J 7/00* (2013.01); *G06F 1/26* (2013.01); *H02J 7/0068* (2013.01); *H02J 7/345* (2013.01); *Y10T 307/391* (2015.04)

(58) Field of Classification Search
CPC ........................................................ H02J 1/00
USPC ............................................................ 307/71
See application file for complete search history.

(56) References Cited

U.S. PATENT DOCUMENTS

| | | | | |
|---|---|---|---|---|
| 2012/0008443 | A1* | 1/2012 | Hebig | G11C 7/02 365/203 |
| 2015/0236583 | A1* | 8/2015 | Ripley | H02M 3/06 323/234 |

* cited by examiner

*Primary Examiner* — Robert Deberadinis
(74) *Attorney, Agent, or Firm* — Perkins Coie LLP

(57) ABSTRACT

Power supplies for electronic devices (e.g., portable ultrasound devices) are disclosed herein. In one embodiment, a stack of batteries and one or more switches between the batteries can change a voltage provided to a terminal that is connectable to a load. A charge pump comprising a number of capacitors are connected by switches. In one configuration, the switches are set so that each capacitor is charged from a common voltage source. In another mode, the switches are connected such that capacitors can be connected in series to provide a multiple of the charging voltage to the load.

18 Claims, 3 Drawing Sheets

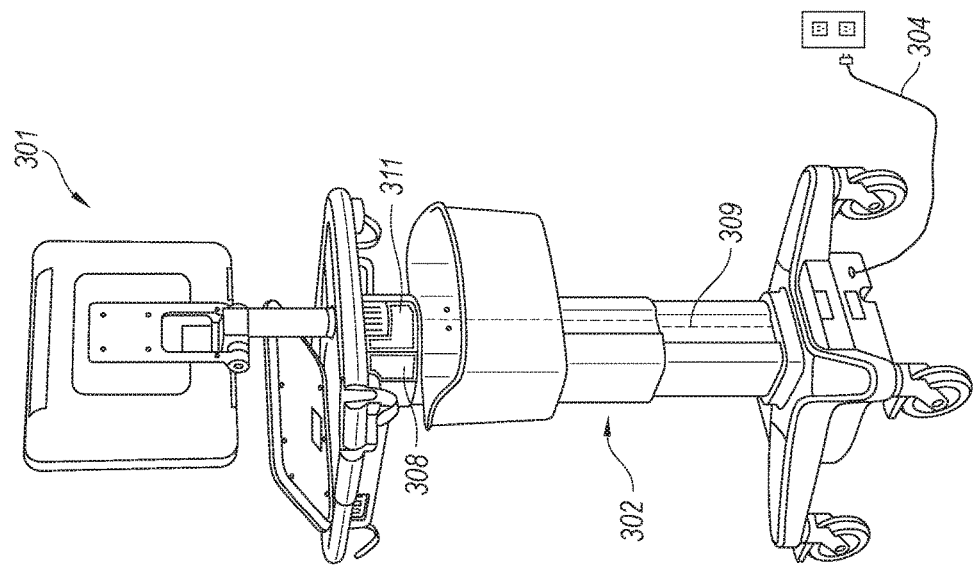
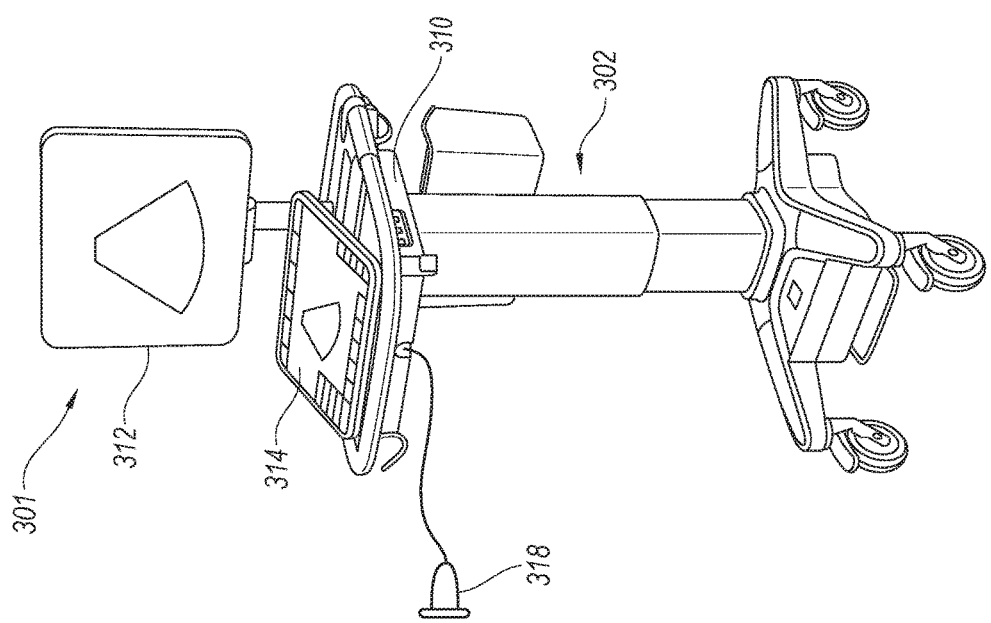

LOW NOISE POWER SOURCES FOR PORTABLE ELECTRONIC SYSTEMS

RELATED APPLICATION

The present application claims the benefit of U.S. Provisional Application No. 61/801,727 filed Mar. 15, 2013, which is herein incorporated by reference in its entirety.

TECHNICAL FIELD

The disclosed technology relates generally to electric power sources for portable electronic devices and systems, and in particular to compact, efficient, and low noise for portable ultrasound imaging devices.

BACKGROUND

Many portable electronic devices include switching power supplies (e.g., DC-to-DC converters) having a circuit topology (e.g., flyback, buck, boost, push-pull, etc.) with one or more large passive components (e.g., an inductor). The switching power supply circuits can be bulky and may consume a large volume of current. Switching power supplies can also be inefficient, particularly if, for example, a cascade of DC-to-DC converters is used generate voltages on multiple rails. Moreover, switching power supplies can generate electro-magnetic interference and switching harmonics, which can produce noise in an image (e.g., an ultrasound image) formed by a system connected to the power supply. Mitigation of the noise sources may require using extensive countermeasures such as, for example, synchronization of the switching supplies to the acquisition timing (e.g., with a Doppler image) and/or extensive passive filtering and shielding (e.g., with a B-Mode image). Given these problems and others, a need exists for a simpler, more efficient circuit configuration that produces various voltage levels with minimal noise.

BRIEF DESCRIPTION OF THE DRAWINGS

FIGS. 3A and 3B are front and rear views, respectively, of an ultrasound device with a power supply configured in accordance with an embodiment of the disclosure.

DETAILED DESCRIPTION

The technology disclosed herein relates to improvements for electrical power supplies for portable electronic devices. Although the technology is described with respect to its use with ultrasound imaging systems, it will be appreciated that the technology can also be used in any other suitable electronic device such as, for example, mobile devices, tablets, laptop computers, personal digital assistants, personal audio/video players, and/or any other device that uses a cordless power source. The disclosed technology offers several advantages over typical power supplies used in many portable electronic devices such as, for example, reduced energy losses (e.g., heat losses), simpler configurations, a reduced electrical noise in an image produced by the device (e.g., an ultrasound device), and/or elimination of heavy, bulky, interference-producing components (e.g., inductors).

An electrical power supply configured in accordance with the present disclosure can, for example, provide for one or more of the following benefits:

Appropriate voltages generated from different battery chemistries;

Appropriate series and parallel combinations of selected nominal battery voltages to achieve voltages very close to the rails needed by various electronic components;

The use of low impedance switches;

LDO (low drop out) regulators where necessary; and

Charge pump topology HV and HVBias rails.

Figure 1:
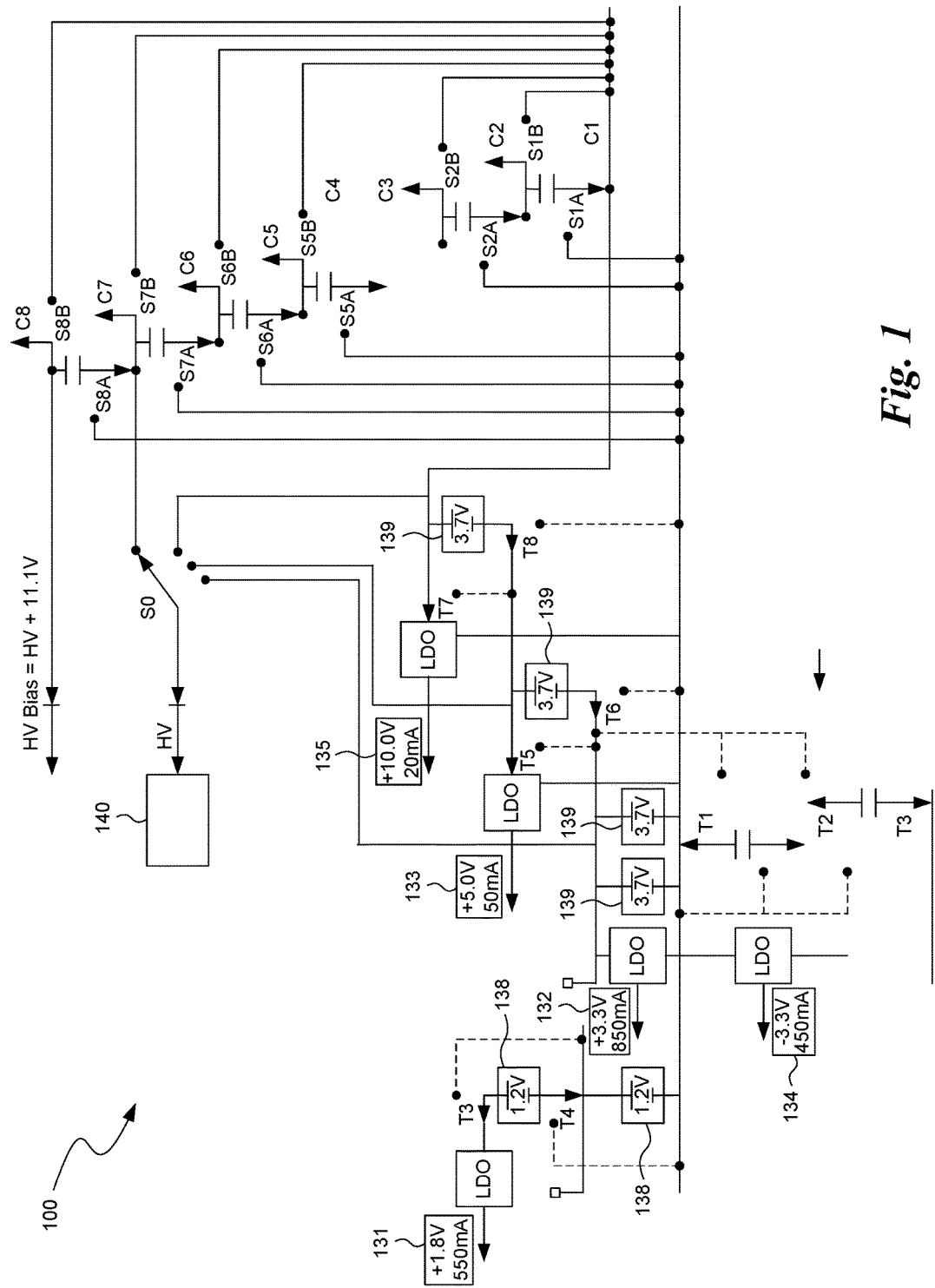
FIG. 1 is a circuit diagram of a power supply configured in accordance with an embodiment of the disclosure.

FIG. 1 is a circuit diagram of a power supply 100 configured in accordance with an embodiment of the present disclosure. The power supply 100 can be configured for use in, for example, a portable ultrasound device. The power supply 100 includes a first output rail 131, a second output rail 132, a third output rail 133, a fourth output rail 134 and a fifth output rail 135. The power supply 100 further includes a plurality of first batteries 138 and a plurality of second batteries 139. In some embodiments, the first batteries can have a first chemistry and the second batteries can have a second chemistry different from the first chemistry.

In the illustrated embodiment, the following voltage-current combinations can be supplied: +1.8V @550 mA; +3.3V @450 mA; +5V @50 mA; −3.3V @450 mA; +3.3V @400 mA; +10V @20 mA; HV (+11V to +88V variable) @1.8 W; and/or HVBias (HV+10V) @2 ma. In other embodiments, however, any suitable voltage capable of being supplied by battery chemistries may be implemented. The voltages on the output rails 131-135 can be provided by, for example, batteries (e.g., nickel-metal hydride, nickel cadmium, nickel zinc, or lithium polymer batteries), capacitors and/or inductors. One or more electrical links can electrically connect or couple the output rails 131-135 to other circuit components (e.g., capacitors, LDOs, inductors, batteries, switches, etc.). As those of ordinary skill in the art will appreciate, the electrical links can, in some embodiments, comprise one or more semiconductor devices.

+1.8V @550 mA

A first output rail 131 (e.g., a 1.8V rail) can be created by using two of the first batteries 138 (e.g., two NiMH (nickel-metal hydride) cells) that are connected in series with one another to generate a nominal 2.4V rail. A Low Dropout Regulator ("LDO") (or another voltage regulator) can be used to create a regulated 1.8V at 550 mA at the first output rail 131 wasting only, for example, 0.33 W maximum (less as the battery discharges). Alternatively, a single lithium sulfur cell with a nominal 2V output followed by one of the voltage regulators 136 could be used with more efficiency.

+3.3V @850 mA

In one embodiment, a second output rail 132 (e.g., a 3.3V rail) is created by using two of the second batteries 139 (e.g., two parallel LiPo (lithium polymer) cells) to generate a nominal 3.7V rail of sufficient current capacity. An LDO can be used to create a regulated +3.3V @850 mA from the second output rail while dissipating only 0.34 W maximum (typically 0.21 W).

+5V @50 mA

In the embodiment shown, a third output rail (e.g., a 5V rail) is created by placing one of the second batteries 139 (e.g., a LiPo (lithium polymer) cell on top of the +3.3V rail 132 to generate a nominal 7.4V rail. An LDO can be used to create a regulated 5V at 50 mA from the third output rail while dissipating only 0.12 W maximum.

−3.3V @450 mA

In the embodiment shown, a fourth output rail 134 (e.g., a −3.3V rail) is created by using one of the second batteries 139 (e.g., a single LiPo (lithium polymer) cell) to generate a nominal −3.7V rail by connecting the anode of the battery to the system ground. An LDO of negative polarity is used to create a regulated −3.3V at 450 mA for the fourth output rail 134 while dissipating only 0.18 W maximum (typically 0.11 W).

+10V @20 mA

In the embodiment shown in FIG. 1, a fifth output rail 135 (e.g., a 10V analog rail) is created by placing a second battery 139 (e.g., a LiPo (lithium polymer) cell) on top of the +7.4V that is used to create the 5V rail 133 in order to generate a nominal 11.1V rail. An LDO is used to create a regulated 10V at 20 mA from the 11.1 volts while dissipating approximately 0.02 W maximum.

HV analog @1.8 W

A high voltage (HV) analog rail is a variable rail (e.g., ranging from 4V to 89V) that supplies energy to the ultrasound pulsers 140. In the illustrated embodiment, the rail is created with a series stack of cells and capacitors of varying and coarse resolution (3.7V, 7.4V, 11.1V, 22.2V, 33.3V, 44.4V, 55.5V, 66.6V, 77.7V, and 88.8V. In the embodiment shown, this is accomplished by selecting one of four connections with a switch S0. Three of the connections at switch S0 are to the voltage rails of 11.1V or less that are directly driven by the stacks of cells. The fourth connection is to a charge pump stack of capacitors. This switch can comprise a low resistance switch (e.g., less than one ohm) to keep the power dissipation low.

A plurality of charge pump capacitors $C_1$, $C_2$ and $C_5$-$C_8$ have a corresponding pair of switches. The bottom side of each charge pump capacitor is connected to a switch with a suffix A, e.g. S1A, S2A, . . . , S8A. This switch is either thrown to the position of being connected to ground or being connected to the top of the previous capacitor. The top side of the capacitor is connected to a switch with a suffix B, e.g. S1B, S2B, . . . , S8B. This switch is either in a no-connect position or in a position connected with the 11.1V rail. FIG. 1 shows each of these switches in the positions of when the charge pump capacitors are being used to source current to the TX pulsers at 88.8V. In the illustrated embodiment, capacitors C4 and C5 and switches S4A, S4B, S5A and S5B have been omitted for clarity. Those of ordinary skill in the art will realize, however, that these components can be arranged between C2 and C5.

When all switches are thrown to the opposite positions, the capacitors are connected to an 11.1V rail to be charged by the cell stack. From this baseline configuration, when the S8A and S8B switches are thrown as shown in FIG. 1 (e.g., S7A is grounded and S7B is closed), 11.1V is supplied to the TX pulsers and HVBias is provided 11.1V above the HV rail. When S7A and S7B switches are thrown (and S6A is grounded and S6B is closed), 22.2V is supplied to the TX pulsers. When S6A and S6B switches are thrown, 33.3V is supplied, etc. In this way 11.1V to 88.8V in increments of 11.1V steps can be applied to the pulsers all the while keeping HVBias 11.1V above this rail. These switches are controlled by digital logic (not shown) which is commanded to a particular voltage level.

The operation of the circuit topology described can be preferably implemented using relatively fast, low resistance switches and large capacitors. As those of ordinary skill in the art will appreciate, however, any suitable switch and/or capacitor may be used in the power supply 100. Determining suitable switches or capacitors are described in further detail below.

A single ultrasound pulser can consume about 1 A peak at points during a microsecond waveform. There may be on the order of 100 pulsers. Most of this instantaneous power consumption can come from local decoupling capacitors near the pulser that have been charged up to the desired voltage with a much lower average current consumption rate. Roughly speaking, in order to keep the voltage ripple to be about 1V worst case, a suitable capacitor can include a 1 microfarad decoupling capacitor obtained using the formula I=C dV/dT.

Duty cycles are typically no greater than 2% for B-mode ultrasound imaging with average currents much less than the 1 A peak through any one pulser. Actual averaged power consumption is about 1.7 W at 85V. Thus the average current load through switches S1A/B thru S8A/B can be about 20 mA. Power is roughly held constant as waveforms grow or voltages shrink. Thus, as voltages decrease, the current may increase proportionately. For example, at 11.1V, the current can be, for example, 160 mA. Thus, to keep heat dissipation down to less than 0.1 W, suitable switches can include fast switches (e.g., capable of changing state in less than 10 microseconds) having resistances less than 0.5 ohm according to the relationship $P=I^2R$. As those of ordinary skill of the art will appreciate, the use of fast switches can allow synchronization of switching to a pulser repetition interval.

Suitable charge pump capacitors can be sized proportional to the energy consumed from the decoupling capacitors they are recharging at an average rate. The total energy consumed is $\frac{1}{2} \times C(V_2^2-V_1^2)$ or 8 mJ assuming a starting voltage of 80V and an ending voltage at 79V. To supply 8 mJ with an 8V drop (88V to 80V) from the capacitor stack would require a capacitance of 11.8 microfarads. A stack of 7 capacitors can necessitate each one to be 7 times larger than the individual decoupling cap or 83 microfarads each.

The average current sourced by this capacitor stack can be, in some cases, about 2 amps. Accordingly, a low resistance, for example, can keep the voltage drop across the aggregate switches to be much less than 8V. To keep it to about ½V, the resistance can be 35 milliohm each switch and the energy dissipated as heat would be 22*(35 milliohm*7)*50 microseconds or 50 uJ which is much smaller than 8.5 mJ as desired. Thus, most of the energy is charging the decoupling capacitors instead of being dissipated as heat and the voltage drop is mostly across the capacitors instead of the switches as assumed.

HV Bias @2 mA

The high voltage bias (HV Bias) rail supplies energy to a component 140 (e.g., a high voltage component, an ultrasound transducer, etc.). In this embodiment, the rail is created with another 11.1V charged capacitor in series with the HV rail.

Charging

Low resistance switches T1-T8 can be employed to reduce the number of rails for charging. The charging points can be located at, for example, the first batteries 138, and/or the second batteries 139. In this case, two charging voltages may be used. FIG. 1 shows the switches T1-T8 in a first circuit configuration or a normal working configuration. In a second circuit configuration or charging configuration, the switches T1-T8 can be in their opposite positions indicated by the bold dashed lines. In order to minimize heat generation to about 0.15 W, these switch resistances may preferably be about ¹⁄₁₆ ohm each.

Noise

Batteries, capacitors, and inductors contribute very little white noise. In one embodiment, the charge pumping events used in generating or maintaining the voltage rails is always in sync with the transmit pulsing at a very low pulse repetition frequency, Doppler modality should not suffer noise effects. B-mode should not experience any "herring bone" patterns since there is no charge pumping activity occurring during receive. Artifacts of the pumping should be restricted to near skin line or before.

Size

Since the cells are sized to be close to the final desired voltage rails, the LDO components are small. In the embodiment disclosed, it is anticipated that the charge pump capacitors are smaller than the cell stack required to perform the same function if they exist at all in small enough form factors.

Figure 2:
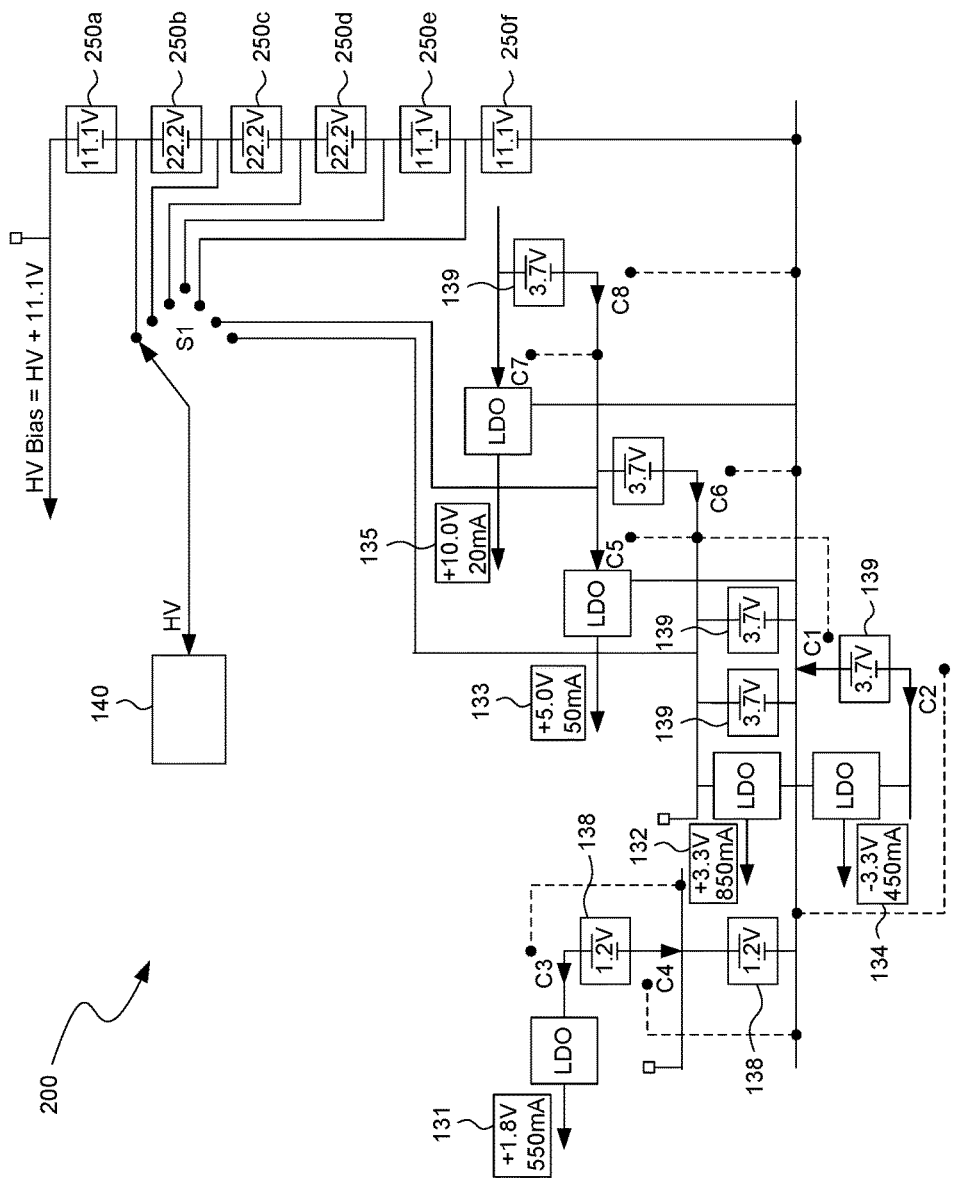
FIG. 2 is a circuit diagram of a power supply configured in accordance with another embodiment of the disclosure.

FIG. 2 is a circuit diagram of a power supply 200 configured in accordance with an embodiment of the present disclosure. The power supply 200 includes a plurality of cells 250a-f. In the illustrated embodiment, the HV rail is created with batteries or a series stack of cells 250a-f of varying and coarse resolution (e.g., 3.7V, 7.4V, 11.1V, 22.2V, 44.4V, 66.6V, 88.8V, etc.). This can be performed, for example, by selecting one of eight connections with switch S1. This switch can comprise, for example, a low resistance switch (e.g., less than one ohm) to keep the power dissipation low.

A suitable resistance can be estimated as follows. A single pulser can consume about 1 A for about 1 microsecond. There can be on the order of 100 pulsers. Most of the instantaneous power consumption comes from local decoupling capacitors near the pulser. In order to keep the voltage ripple to be about 1 V, a 1 microfarad capacitor is required following the formula I=C dV/dT. Thus the average current load on the cells can be 100 A×0.02 or 2 A. Thus, to keep power consumption down to less than 1 Watt, the switch S1 can have a resistance, for example, on the order of 0.1 ohm according to the relationship $P=I^2R$.

FIGS. 3A and 3B are front and rear views, respectively, of an ultrasound device 301 removably coupled to a stand assembly 302 and configured in accordance with an embodiment of the disclosure. The device 301 includes a first power supply 308 and a second power supply 311 which can be electrically connected to external power via an electrical link 309 to and/or power cord 304. The device 301 can include an ultrasound imaging system 310 coupled to display 312, a user interface 314, and a probe 318.

In the illustrated embodiment of FIGS. 3A and 3B, for example, the first power supply 308 (e.g., a battery pack) can be charged while the second power supply 311 (e.g., a battery pack) is being used. When the first power supply 308 requires charging, a transfer switch (not shown) can switch seamlessly to the second power supply 311 as a source of electric power for the device 301 while maintaining the voltage rails within tolerance during the operation. The expended first power supply 308 is then placed into recharging mode. In this mode, the battery configuration reconfigures so that all batteries are charged in parallel. A quiet, single rail charger may then used to charge all unused cells at once.

There are two modes of operation when the device 301 is out of the stand:

Off and not charging
On and not charging

There are two modes of operation when the device 301 is on the stand:

Off and charging both battery packs
On and charging one battery pack while using the other Starting from dead power supplies in a stand (which should only happen with a stand that has not been plugged in), a few minutes may be required before operation to charge both battery packs to some level. After this point, one of the battery packs may be used while the other keeps charging. Not long after usage of the first battery pack, it will discharge to the point a switch is made. As long as the charge rate is higher than the discharge rate, then the time between switching will increase even under continuous use.

Charge and discharge rates are a function of battery capacity, C. As an example, AA NiZn batteries have a capacity of 1500 mAh. They are charged at a rate of at least c/2 (750 mA) until reaching 1.9V which is then maintained until current drops to 75 mA. Thus, as long as there are enough of these cells in parallel to keep the current draw less than 750 mA per cell, the objective of the cell discharge rate being less than the cell charge rate is accomplished.

From the foregoing, it will be appreciated that specific embodiments of the invention have been described herein for purposes of illustration, but that various modifications may be made without deviating from the spirit and scope of the invention. Accordingly, the invention is not to limited except as by the appended claims and equivalents thereof.

I claim:

1. A portable ultrasound device, comprising:
an ultrasound probe;
one or more ultrasound pulsers electrically coupled to the ultrasound probe; and
a power supply coupled to the one or more ultrasound pulsers, the power supply including
an input terminal connectable to a charger; and
an output voltage rail electrically connected to the one or more ultrasound pulsers and constructed from a combination of energy storage devices that are configured to switch between a first configuration for supplying energy to the one or more ultrasound pulsers and at least a second configuration for charging from the input terminal,
wherein the output voltage rail is configured to switch between the first configuration and the second configuration in synchronicity with one or more ultrasound transmission pulses produced by the one or more ultrasound pulsers.

2. The device of claim 1 wherein the energy storage devices comprise one or more of the following: batteries, capacitors and inductors.

3. The device of claim 1 wherein the energy storage devices comprise a first battery and a least a second battery, wherein a chemistry of the first battery is different from a chemistry of the second battery.

4. The device of claim 1 wherein individual energy storage devices include a semiconductor switch.

5. The device of claim 4 wherein the semiconductor switch is configured to switch a corresponding energy storage device between the first configuration and the second configuration.

6. The of device of claim 4 wherein the impedance of the semiconductor switch is less than 1 ohm.

7. The device of claim 1 wherein the output voltage rail in the first configuration includes a stack of at least two energy storage devices.

8. A power supply for a portable ultrasound device, the power supply comprising:
an input terminal electrically coupled to a charger; and
a first rail and at least a second rail, wherein each rail is configured to connect to an electronic circuit, wherein each rail is constructed from a combination of energy storage devices configured to switch between operating in a first configuration for supplying energy to one or more ultrasound pulsers and at least a second configuration for charging via the input terminal, wherein the first and second rails are configured to switch between the first configuration and the second configuration in synchronicity with one or more ultrasound transmission pulses produced by the one or more ultrasound pulsers, and wherein the second rail is configured to operate in the second configuration when the first rail operates in the first configuration, and wherein the second rail is configured to operate in the first configuration when the first rail operates in the second configuration.

9. The power supply of claim 8 wherein the energy storage devices comprise one or more of the following: batteries, capacitors and inductors.

10. The power supply of claim 8 wherein the energy storage devices comprise a first battery and a least a second battery, wherein a chemistry of the first battery is different from a chemistry of the second battery.

11. The power supply of claim 8 wherein individual energy storage devices include a semiconductor switch.

12. The power supply of claim 11 wherein the semiconductor switch is configured to switch a corresponding energy storage device between the first configuration and the second configuration.

13. The power supply of claim 11 wherein the impedance of the semiconductor switch is less than 1 ohm.

14. The power supply of claim 8 wherein the first rail in the first configuration includes a stack of at least two energy storage devices.

15. A power supply for an ultrasound device, the power supply comprising:
an input terminal electrically coupled to a charger; and
a first rail and at least a second rail, wherein each rail is constructed from a combination of energy storage devices configured to switch between operating in a first configuration for supplying energy to one or more ultrasound pulsers and at least a second configuration for charging via the input terminal, and wherein the first and second rails are configured to switch between the first configuration and the second configuration in synchronicity with one or more ultrasound pulses transmitted from the one or more ultrasound pulsers.

16. The power supply of claim 15 wherein the energy storage devices comprise a first battery and a least a second battery, wherein a chemistry of the first battery is different from a chemistry of the second battery.

17. The power supply of claim 15 wherein the second rail is configured to operate in the second configuration when the first rail operates in the first configuration, and wherein the second rail is configured to operate in the first configuration when the first rail operates in the second configuration.

18. The power supply of claim 15 wherein individual energy storage devices include at least one semiconductor switch configured to switch the energy storage device between the first configuration and the second configuration.

* * * * *